(12) United States Patent
Dindi et al.

(10) Patent No.: US 8,084,655 B2
(45) Date of Patent: *Dec. 27, 2011

(54) CATALYTIC PROCESS FOR CONVERTING RENEWABLE RESOURCES INTO PARAFFINS FOR USE AS DIESEL BLENDING STOCKS

(75) Inventors: Hasan Dindi, Wilmington, DE (US); Sourav K. Sengupta, Wilmington, DE (US); Andrew Francis Gonzon, Newark, DE (US); David Richard Corbin, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/138,764

(22) Filed: Jun. 13, 2008

(65) Prior Publication Data
US 2008/0308458 A1    Dec. 18, 2008

Related U.S. Application Data

(60) Provisional application No. 60/934,710, filed on Jun. 15, 2007.

(51) Int. Cl.
*C07C 1/00* (2006.01)
(52) U.S. Cl. .......... 585/240; 585/242; 585/733
(58) Field of Classification Search .......... 585/240, 585/242, 733
See application file for complete search history.

(56) References Cited

U.S. PATENT DOCUMENTS

| | | | |
|---|---|---|---|
| 4,472,266 A * | 9/1984 | Oleck et al. | 208/111.15 |
| 4,554,397 A | 11/1985 | Stern et al. | |
| 4,655,906 A | 4/1987 | Bjornson et al. | |
| 4,678,860 A | 7/1987 | Kuester | |
| 4,992,605 A * | 2/1991 | Craig et al. | 585/240 |
| 5,705,722 A * | 1/1998 | Monnier et al. | 585/240 |
| 6,005,143 A | 12/1999 | Machado et al. | |
| 7,169,291 B1 | 1/2007 | Wang | |
| 7,232,935 B2 * | 6/2007 | Jakkula et al. | 585/240 |
| 7,459,597 B2 * | 12/2008 | Koivusalmi et al. | 585/733 |
| 7,550,634 B2 * | 6/2009 | Yao et al. | 585/240 |
| 7,626,063 B2 * | 12/2009 | Ghonasgi et al. | 585/276 |
| 2004/0230085 A1 * | 11/2004 | Jakkula et al. | 585/240 |
| 2005/0039383 A1 | 2/2005 | Wu | |
| 2005/0120621 A1 | 6/2005 | Lawson et al. | |
| 2005/0274065 A1 | 12/2005 | Portnoff et al. | |
| 2006/0080891 A1 | 4/2006 | Ghosh et al. | |
| 2006/0161032 A1 | 7/2006 | Murzin et al. | |
| 2006/0207166 A1 | 9/2006 | Herskowitz et al. | |
| 2006/0252950 A1 | 11/2006 | Ginosar et al. | |
| 2006/0260186 A1 | 11/2006 | Iversen et al. | |
| 2006/0264684 A1 | 11/2006 | Petri et al. | |
| 2006/0293533 A1 | 12/2006 | Iyer | |
| 2007/0010682 A1 * | 1/2007 | Myllyoja et al. | 554/174 |
| 2007/0066838 A1 | 3/2007 | Hillion et al. | |
| 2007/0068848 A1 * | 3/2007 | Monnier et al. | 208/15 |
| 2007/0073070 A1 | 3/2007 | Hillion et al. | |
| 2007/0083056 A1 | 4/2007 | Srinivas et al. | |
| 2007/0135669 A1 | 6/2007 | Koivusalmi et al. | |
| 2007/0170091 A1 | 7/2007 | Monnier et al. | |
| 2007/0175795 A1 | 8/2007 | Yao et al. | |
| 2007/0225383 A1 | 9/2007 | Cortright et al. | |
| 2007/0260102 A1 * | 11/2007 | Duarte Santiago et al. | 585/733 |
| 2008/0269352 A1 | 10/2008 | Falkowski et al. | |
| 2009/0062578 A1 * | 3/2009 | Koivusalmi et al. | 585/14 |

FOREIGN PATENT DOCUMENTS

| | | |
|---|---|---|
| BR | 2004 004310 | 5/2006 |
| BR | 2005 003215 | 12/2006 |
| BR | 2005 002795 | 2/2007 |
| EP | 1 724 325 | 11/2006 |
| EP | 1 741 767 A1 | 1/2007 |
| EP | 1 741 768 A1 | 1/2007 |
| ES | 2245270 | 12/2005 |
| FR | 2890961 | 3/2007 |
| JP | 2006050954 | 2/2006 |
| JP | 2006104316 | 4/2006 |
| JP | 2006213829 | 8/2006 |
| MX | 2004005349 | 12/2005 |
| SU | 1162479 | 6/1985 |
| WO | WO 98/30323 | 7/1998 |
| WO | WO 99/09116 | 2/1999 |
| WO | WO 2004/048311 A1 | 6/2004 |
| WO | WO 2006/084048 A1 | 8/2006 |
| WO | WO 2006/111997 A1 | 10/2006 |
| WO | WO 2006/119357 A3 | 11/2006 |
| WO | WO2007003708 * | 1/2007 |
| WO | WO 2007/020465 A1 | 2/2007 |
| WO | WO 2008/020048 A2 | 2/2008 |

OTHER PUBLICATIONS

Furimsky, Mechanism of Catalytic Hydrodeoxygenation of Tetrahydrofuran; Industrial & Engineering Chemistry Product Research and Development (1983), 22(1), 31-34; Publisher: The American Chemical Society Abstract.

Levy et al., Alkane liquid fuels production from biomass; Liq. Fuel Dev. (1983), 159-88; Pub: CRC, Boca Raton, Florida, USA. Abstract.

(Continued)

*Primary Examiner* — Nina Bhat

(57) ABSTRACT

A process for converting renewable resources such as vegetable oil and animal fat into paraffins in a single step which comprises contacting a feed which is a renewable resources with hydrogen and a catalyst which comprises a non-precious metal a first oxide and optionally a second oxide wherein at least one of the first oxide or second oxide comprises a zeolite, through hydrodeoxygenation and one or both of hydroisomerization and hydrocracking.

20 Claims, No Drawings

OTHER PUBLICATIONS

Elliott et al., Hydrodeoxygenation of wood-derived liquids to produce hydrocarbon fuels; Proceedings of the Intersociety Energy Conversion Engineering Conference (1985), 20$^{th}$(vol. 1), 1.586-1.592; Pacific Northwest Lab., Richland, Washington, USA. Abstract.

Held et al., Production of hydrocarbons from biomass; Comm. Eur. Communities, [Rep.] EUR (1985), EUR 10024, Energy Biomass, 744-8; Germany. Abstract.

Ooi, et al., Reaction of palm stearin catalyzed by nickel (II) ion-exchanged zeolite 13X. Formation of hydrocarbons; Yukagaku (1986), 35(5), 354-8; Palm Oil Res. Inst., Kuala Lumpur, Malaysia. Abstract.

Ratcliff et al., Hydrodeoxygenation of lignins and model compounds; Applied Biochemistry and Biotechnology (1988), 17, 151-160; Chem. Convers. Res. Branch, Solar Energy Res. Inst., Golden, Colorado 80401, USA. Abstract.

Ratcliff et al., Hydrodeoxygenation of a lignin model compound; Res. Thermochem. Biomass Convers., [Ed. Rev. Pap. Int. Conf.] (1988); Publisher: Elsevier, London, UK. Abstract.

Gellerman et al., Study of spent hydrorefining catalysts; Khimiya i Tekhnologiya Topliv i Masel (1993), (8), 32-34; VNII NP, Russia. Abstract.

Stumborg et al., Catalytic conversion of vegetable oils to diesel additives; Energy from Biomass and Wastes. (1993), 16, 721-38; Canada. Abstract.

Laurent et al. Hydrodeoxygenation of oxygenated model compounds: Simulation of the hydropurification of bio-oils; Adv. Thermochem. Biomass Convers., [Ed. Rev. Pap. Int. conf.] 3$^{rd}$ (1994); Publisher: Blackie, Glasgow, UK. Abstract.

Wong et al., Conversion of vegetable oils and animal fats into paraffinic cetane enhancers for diesel fuels; Proceedings, Biomass Conference of the Americas: Energy, Environment, Agriculture and Industry, 2$^{nd}$, Portland, Oregon, USA, Aug. 21-24, 1995, 902-910; Publisher: National Renewable Energy Laboratory, Golden, Colorado, USA. Abstract.

Bridgewater, Production of high grade fuels and chemicals from catalytic pyrolysis of biomass; Catalysis Today (1966), 29, 285-295; Elsevier Science B.V.

Horne et al., Premium grade hydrocarbons from the catalytic treatment of pyrolysis vapors derived from biomass; Biomass for Energy and the Environment, Proceedings of the European Bioenergy Conference, 9$^{th}$, Copenhapen, Jun. 24-27, 1996, vol. 3, 1601-1606; Publisher: Elsevier, Oxford, UK. Abstract.

Okuda et al., Hydrodeoxygenation of phenol derivatives using Ni-Mo/Al2O3 and Co-Mo/Al2o3 catalysts; Sekiuy Gakkaishi (1997), 40(3), 192-198; Dep. Chem.. Eng., Fac. Eng., Kansai Univ., Suita, Osaka, 564, Japan. Abstract.

Leng et al., Catalytic conversion of palm oil to fuels and chemicals; Canadian Journal of Chemical Engineering (1999), 77(1), 156-162; Canadian society for Chemical Engineering. Abstract.

Song et al., Mesoporous molecular sieve MCM-41 supported Co-Mo catalyst for hydrodesulfurization of dibenzothiophene in distillate fuels; Applied Catalysis A: General (1999), 176(1), 1-10; Publisher: Elsevier Science B.V.

Twaiq et al., Catalytic Conversion of Palm Oil to Hydrocarbons: Performance of Various Zeolite Catalysts; Ind. Eng. Chem.. Res. (1999), 38, 3230-3237; American Chemical Society.

Liu et al., Preparation and evaluation of Mo-Ni-P catalysts for diesel hydrorefining; Shiyou Xuebao, Shiyou Jiagong (2001), 17(5), 80-86; Publisher: Zhongguo Shihua Chubanshe, China. Abstract.

Twaiq et al., Catalytic conversion of palm oil over mesoporous aluminosilicate MCM-41 for the production of liquid hydrocarbon fuels; Fuel processing Technology (2003), 84, 105-120; Elsevier Science B.V.

Twaiq et al., Liquid hydrocarbon fuels from palm oil by catalytic cracking over aluminosilicate mesoporous catalysts with various Si/Al rations; Microporous and Mesoporous Materials (2003), 64, 95-107; Elsevier, Inc.

Chiranjeevi et al., Effect of Si/Al ratio of HMS support on catalytic functionalities of Mo, CoMo, NiMo hydrotreating catalysts; Catalysis Communications (2005), 6(2), 101-106; Publisher: Elsevier B.V.

Criterion DN-2318 Catalyst, Material Safety Data Sheet dated Feb. 23, 2005; Criterion Catalysts & Technologies L.P., Houston, Texas, USA.

Criterion DN-3330 Catalyst, Material Safety Data Sheet dated Feb. 23, 2005; Criterion Catalysts & Technologies L.P., Houston, Texas, USA.

Liu et al., Hydrotreating reaction performance over CoMo-Catalyzed fx-alumina monolith catalyst; Abstracts of Papers, 230$^{th}$ ACS National Meeting, Washington, DC, USA, Aug. 28-Sep. 1, 2005, PETR-048; Publisher: American Chemical Society, USA. Abstract.

Machado et al., Applying monolith reactors for hydrogenations in the production of specialty chemicals—process and economic consideration; Catalysis Today (2005) 105, 305-317; Elsevier.

Senol et al. Hydrodeoxygenation of aliphatic esters on sulphided NoMo/ y-Al$_2$O$_3$ and CoMo/ y-Al$_2$O$_3$ catalyst: The effect of water; Catalysis Today (2005), 106(1-4), 186-189; Publisher: Elsevier B.V.

Wang et al. Studies on nickel-based bimetallic catalysts for hydrodeoxygenation; Ranliao Huaxue Xuebao (2005), 33(5), 612-616; Publisher: Kexue Chubanshe, China. Abstract.

Yang et al., Effect of Mo, W addition on performance of Ni/A12O3 catalysts for hydrodeoxygenation; Huagong Jinzhan (2005), 24(12), 1386-1389; Publisher Huaxue Gongye Chubanshe, China. Abstract.

Petrus et al., Biomass to biofuels, a chemical perspective; Green Chemistry (2006), 8(10), 861-867; Royal Society of Chemistry, Amsterdam, The Netherlands. Abstract.

Snåre et al., Heterogeneous Catalytic Deoxygenation of Stearic Acid for Production of Biodiesel; Ind. Eng. Chem. Res. (2006), 45, 5708-5715; American Chemical Society.

Stadlbauer et al., Production of hydrocarbons from animal fat by thermocatalytic cracking; Erdoel, Erdgas, Kohle (2006), 122(2), 64, 66-69; Publisher: Urban-Verlag Hamburg/Wien GmbH, Germany. Abstract.

Busnardo et al., Processing of spent NiMo and CoMo/A12O3 catalysts via fusion with KHSO4; Journal of Hazardous Materials (2007), 139(2), 391-398; Publisher: Elsevier B.V.

Demirbas, Production of gasoline and diesel fuels from bio-materials; Energy Sources, part A: Recovery, Utilization, and Environmental Effects (2007), 29(8), 753-760; Taylor & Francis, Inc. Abstract.

Huber et al., Processing biomass in conventional oil refineries: Production of high quality diesel by hydrotreating vegetable oils in heavy vacuum oil mixtures; Applied Catalysis, A: General (2007), 329, 120-129; Elsevier B.V.

Delmon, Catalysts in petroleum refining 1989; Studies in Surface Science and Catalysis; (1990), 1-38; Publisher: Elsevier B.V.

Dwyer, Zeolite structure, composition and catalysis; Chemistry and Industry, (Apr. 1984), 258-269.

* cited by examiner

CATALYTIC PROCESS FOR CONVERTING RENEWABLE RESOURCES INTO PARAFFINS FOR USE AS DIESEL BLENDING STOCKS

FIELD OF THE INVENTION

The present invention relates to a process and a catalyst for the production of linear and branched paraffins (hydrocarbons) from renewable resources that are useful as a blending stock for diesel fuel for use in warm and cold climates.

BACKGROUND OF THE INVENTION

The high cost and increased environmental footprint of fossil fuels and limited petroleum reserves in the world have increased the interest in renewable fuel sources. Renewable resources include ethanol from corn and sugar for use in automobiles, and plant oils for use as diesel fuel. Research in the diesel fuel area includes two main areas, bio-diesel and green diesel.

Transesterification of fatty acids in triglycerides into methyl esters using methanol and a catalyst such as sodium methylate produces FAME (Fatty Acid Methyl Ester), which is commonly referred to as bio-diesel. These methyl esters, mainly linear $C_{14}$ to $C_{22}$ carboxylic acids, can be used as fuel or can be blended into diesel refined from crude oil sources. The transesterification reaction is complex. To be used as diesel fuel, costly modification of diesel engine is necessary as well as conversion of associated piping and injector configurations. Other disadvantages include poor performance of bio-diesel in cold weather applications, limiting its world wide use to warmer climates, and poor emissions. In addition, use of bio-diesel increases maintenance costs due to poor lubricity, increased viscosity, and high oxygen content. Bio-diesel, while a renewable resource, brings a high cost of use for processing and use in engines.

Diesel from renewable resources, commonly referred to as green diesel, involves converting the fatty acids in triglycerides into linear alkanes via hydrodeoxygenation (HDO). The triglyceride backbone is converted to propane and separated. Green diesel can be used as a fuel by itself or as a mixture with diesel from petroleum feedstocks (petro diesel) with little to no engine modification and can be processed in refineries currently refining crude oils. Current processes involve multiple steps to obtain green diesel fuel with comparable properties with petro diesel. Steps include hydrodeoxygenation, hydroisomerization and/or hydrocracking.

Delmon, B. "Catalysts in Petroleum Refining 1989" in: Studies in Surface Science and Catalysis, Eds. Trimm, D. L., Akashah, S., Absi-Halabi, M., and Bishara, A. (Elsevier, Amsterdam, 1990), pp 1-38, discloses the transformation of a very large portion of crude oil to usable products depends on cracking and hydrotreating processes. Over the last several decades, hydrotreating processes have become more complex and diversified and includes such processes as, hydropurification (e.g., removal of sulfur, nitrogen, oxygen, metals, etc.), hydroconversion (e.g., production of jet fuels or lubricants), and hydrocracking (mild or heavy hydrocracking). Specifically, the removal of sulfur, nitrogen, oxygen, and metals are called hydrodesulfurization, hydrodenitrogenation, hydrodeoxygenation, and hydrodemetallization, respectively.

Certain hydrotreating catalysts for use with petroleum feedstocks comprise one or more non-precious metals such as nickel, cobalt, molybdenum and tungsten supported on mono- or mixed-metal oxides such as alumina, silica or silica-alumina. The catalysts can be promoted by Group I metals (e.g., lithium, sodium and potassium) and/or fluorine, boron, and phosphorus. The catalyst is activated by simultaneous reduction and sulfidation in place before subjecting it to hydrotreating reactions. Catalysts consisting of molybdenum supported on alpha-alumina with promoters such as cobalt (Co—Mo/$Al_2O_3$) or nickel (Ni—Mo/$Al_2O_3$) are extensively used in the hydrotreating of petroleum fractions and resids.

The catalyst most commonly used for the production of diesel from renewable resources comprises a precious metal such as platinum and/or palladium. Murzin et al. in Industrial Engineering Chemical Research, Vol. 45 (2006) pp. 5708-5715, disclose numerous metals used for such catalysis. Platinum and palladium gave the best conversion of desired products. Nickel catalysts produced unwanted heavier products such as dimers due to the recombination of moieties resulting from extensive cracking of the feed material.

Processes are known to produce green diesel. Such processes suffer from one or more deficiencies such as requiring multiple steps, multiple reactors, different catalysts per step and expensive precious metal catalysts.

While there have been great efforts in the green diesel research area, there remains a need for a process of hydrotreating of a renewable feed source where the hydrodeoxygenation, hydroisomerization and hydrocracking processes are simplified using a less expensive, non-precious metal catalyst.

SUMMARY OF THE INVENTION

Provided is a process for hydrotreating which comprises (a) providing a feed which is a renewable resource; (b) contacting the feed with a catalyst in the presence of hydrogen at a temperature of 250 to 425° C. and a pressure of 500 to 2500 psig (3,450 to 17,250 kPa), to produce a paraffin (hydrocarbon) product, wherein the catalyst comprises one or more active metals and a first oxide and optionally a second oxide wherein at least one of the first oxide or the second oxide comprises a zeolite. In this process, hydrodeoxygenation and one or both hydrocracking and hydroisomerization may occur in a single step.

The active metals used in the process of this invention are non-precious metals including nickel, cobalt, molybdenum, tungsten and combinations of two or more thereof. For long term performance and activity, the catalyst may be initially sulfided in situ or ex situ and the feed may be supplemented periodically by a sulfiding agent (sulfur containing compound). Sulfiding is particularly advantageous when the catalyst comprises molybdenum.

The first oxide comprises a mono- or mixed metal oxide, a zeolite, or a combination of two or more thereof. The first oxide is used as a support for the active metal. The first oxide can be alumina, silica, titania, zirconia, kieselguhr, silica-alumina or combinations of two or more thereof. Silica-alumina includes zeolites. Preferably the first oxide is alumina, silica or a combination thereof.

When the first oxide is not a zeolite, the catalyst comprises a second oxide, which comprises a zeolite. The second oxide can be physically bonded to or mixed with the metal supported on the first oxide.

DETAILED DESCRIPTION OF THE INVENTION

All tradenames used herein are shown in capital letters.

The present invention relates to the production of diesel fuel from renewable resources wherein hydrodeoxygenation and one or both hydroisomerization and hydrocracking may occur in a single step under hydrotreating conditions over a catalyst comprising a non-precious metal and a first oxide, wherein the first oxide is a support, and optionally a second oxide. The process produces substantially linear saturated hydrocarbons with mild branched and mild cracked moieties. These hydrocarbons can be used as diesel fuel or as an additive to blend with petro diesel and possess similar characteristics and performance of petro diesel. Examples of appropriate feed include but are not limited to vegetable oils, animal oils, and oils from wood.

Renewable Resources

The feed is a liquid feed, which is a renewable resource and can be any plant or animal derived oils, fats, free fatty acids and the like. The renewable resources can be any oil, e.g., such as those containing triglycerides or free fatty acids, where the major component comprises aliphatic hydrocarbon chains having $C_{12}$ to $C_{20}$ moieties. Preferably the feed is an oil derived from plants and/or animals, comprising one or more triglycerides. The feed may comprise a mixture of triglycerides. These triglycerides can be derived from a plant selected from the group consisting of pine, rape seed, sunflower, jathropa, seashore mallow and combinations of two or more thereof. The feed can also be a vegetable oil selected from the group consisting of canola oil, palm oil, coconut oil, palm kernel oil, sunflower oil, soybean oil, crude tall oil, and combinations of two or more thereof. The feed source may also comprise poultry fat, yellow grease, tallow, used vegetable oils, or oils from pyrolysis of biomass. The feed may also be oils derived from marine life, such as algae. The process is very flexible and selection of the feed is based on availability and cost.

Catalyst

The catalyst comprises an active metal, a first oxide and optionally a second oxide. The active metal is one or more non-precious metals. The first oxide comprises a mono- or mixed metal oxide, zeolite, or combinations of two or more thereof, and is used as a support. When a second oxide is used it comprises a zeolite.

In one embodiment of this invention, the catalyst comprises an active metal and a first oxide, which may or may not be a zeolite. The catalyst may or may not comprise molybdenum.

The active metals can be nickel (Ni), cobalt (Co), molybdenum (Mo), tungsten (W), or mixtures thereof, e.g., nickel-molybdenum (NiMo), cobalt-molybdenum (CoMo). Preferably, the active metal is Ni. The metal(s) may be either in the reduced or sulfided (e.g., $Ni_9S_8$, $Co_9S_8$, $MoS_2$) form. When the active metal is nickel, higher amounts, such as at least 40 wt %, are needed to reduce in the presence of alumina as the first oxide.

In a reducing step, the catalyst is treated with hydrogen, preferably at elevated temperatures, such as from 100° C. to 400° C. Typically the catalyst temperature is increased during hydrogen flow, such as starting at a temperature of about 130° C. and increasing to a temperature of 250° C. or 350° C. Such methods are known to those skilled in the art. A particular procedure for reducing catalyst is provided below in the Examples.

The catalyst may be sulfided by contacting the prepared catalyst with a sulfur-containing compound such as thiols, sulfides, disulfides, $H_2S$, or combinations thereof at elevated temperatures. The catalyst can be sulfided before it is used or during the hydrotreating process by introducing a small amount of sulfur-containing compounds, such as thiols, sulfides, disulfides, $H_2S$, poultry fat, or combinations of two or more thereof, in the feed. Sulfiding may be important for the long term activity of the catalyst, depending on reaction conditions and feed compositions. A detailed sulfiding procedure is described below in the Examples.

Optionally, a metal promoter may be used with the active metal in the process of the present invention. Suitable metal promoters include: 1) those elements from Groups 1 and 2 of the periodic table; 2) tin, copper, gold, silver, and combinations thereof; and 3) combinations of group 8 metals of the periodic table in lesser amounts.

The active metal, including whether reduced or sulfided, will be selected based on the desired product.

The first oxide comprises a mono- or mixed metal oxide, zeolite, and combinations thereof used as a support for the active metal. The first oxide is used as a support for the active metal. Materials frequently used as the first oxide are porous solids with high total surface areas (external and internal) which can provide high concentrations of active sites per unit weight of catalyst. The first oxide may enhance the function of the active metal; and supported catalysts are generally preferred because the metal is used more efficiently.

The first oxide comprises a porous solid oxide with high total surface areas (external and internal) which can provide high concentrations of active sites per unit weight of catalyst. Preferably the first oxide has pores of a relatively small diameter, that is preferably 50 nm or less. Preferred first oxides have a surface area greater than 20 $m^2$/g, more preferably, the first oxide has a surface area greater than 75 $m^2$/g, still more preferably the first oxide has a surface area of at least 100 $m^2$/g. Generally surface area is less than 300 $m^2$/g.

The first oxide can be any porous solid oxide with high surface area including, but not limited to, oxides such as silica, alumina, titania, titania-alumina, titania-silica, calcium oxide, barium oxide, zirconia, lanthanum oxide, magnesium oxide, kieselguhr, silica-alumina, including zeolites, and zinc oxide. The first oxide is preferably selected from the group consisting of alumina, silica, titania, zirconia, kieselguhr, silica-alumina and combinations thereof. More preferably the first oxide is alumina, silica, kieselguhr, or a combination thereof.

The catalyst may further comprise other materials including carbon, such as activated charcoal, graphite, and fibril nanotube carbon, as well as calcium carbonate, calcium silicate and barium sulfate.

When the first oxide is not a zeolite, the catalyst may comprise a second oxide, which comprises a zeolite. The second oxide can be physically bonded to or mixed with the active metal supported on the first oxide.

The second oxide comprises one or more zeolites. The second oxide is particularly important for hydroisomerization and hydrocracking in the event the first oxide is not a zeolite. That is, if the first oxide does not comprise a zeolite, then a second oxide, which comprises a zeolite, is advantageously used when hydroisomerization and hydrocracking are desired reaction processes. Zeolites can be generically described as complex aluminosilicates characterized by a three-dimensional framework structure enclosing cavities occupied by ions and water molecules, all of which can move with significant freedom within the zeolite matrix. In commercially useful zeolites, the water molecules can be removed from or replaced within the framework without destroying its structure. Zeolites can be represented by the following formula: $M_{2/n}O.Al_2O_3.xSiO_2.yH_2O$, wherein M is a cation of valence n, x is greater than or equal to 2, and y is a number determined by the porosity and the hydration state of the zeolite, generally from 0 to 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations or hydrogen by conventional ion exchange.

The zeolite structure is a corner-linked tetrahedra with Al or Si atoms at centers of tetrahedra and oxygen atoms at corners. Such tetrahedra are combined in a well-defined repeating structure comprising various combinations of 4-, 6-, 8-, 10-, and 12-membered rings. The resulting framework is one of regular channels and cages, which impart a useful pore structure for separation. Pore dimensions are determined by the geometry of the aluminosilicate tetrahedral forming the zeolite channels or cages, with nominal openings of 0.26 nm for 6-membered rings, 0.40 nm for 8-membered rings, 0.55 nm for 10-membered rings and 0.74 nm for 12-membered rings (these numbers assume ionic radii for oxygen). Those skilled in the art will recognize that zeolites with the largest pores being 8-membered rings, 10-membered rings, and 12-membered rings are considered small, medium, and large pore zeolites, respectively. Pore dimensions are critical to the performance of these materials in catalytic and separation applications, since this characteristic determines whether reactant molecules can enter and product molecules (in the catalytic application case) can exit the zeolite framework. In practice, it has been observed that very slight decreases in ring dimensions can effectively hinder or block movement of particular reactants or catalysis products within a zeolite structure.

Zeolites are available from various sources. A comprehensive listing of zeolites vendors is disclosed in "CEH Marketing Research Report: Zeolites" by, 2005, Chemical Economics Handbook-SRI International.

Acid forms of molecular sieve sorbents can be prepared by a variety of techniques including ammonium exchange followed by calcination or by direct exchange of alkali ions for protons using mineral acids or ion exchangers (for a discussion of acid sites in zeolites see J. Dwyer, "Zeolite, Structure, Composition and Catalysis" in Chemistry and Industry, Apr. 2, 1984).

Preferred zeolites are selected from those having medium (10-membered ring) and large (12-membered ring) pore groups. More preferably, the zeolite is selected from the group consisting of MFI (ZSM-5), MEL (ZSM-11), FAU (zeolite Y or USY), MOR (mordenite), and BEA (beta).

Physically mixing the active metal or the active metal and first oxide (supported metal catalyst) with zeolites is sufficient, but one can also co-extrude or pelletize the supported metal catalyst and zeolite after intimately mixing the two, if one desires to do so. A benefit of physically mixing is that the relative concentrations of metal/first oxide and second oxide, thus the catalyst composition, can be changed. Varying the catalyst composition changes the composition of the green diesel product.

The catalyst can be prepared using any of a variety of ways known in the art. Preferably, a preformed (e.g., already calcined) first oxide is used. For example, the first oxide is preferably calcined before application of the active metal. The method of placing the active metal on the first oxide is not critical. Several methods are known in the art. Many suitable catalysts are available commercially.

Relative proportions of active metal and first and optional second oxides, while not critical, are important in that if too little active metal is present, initial activity will be lower than desired and a long activation period may be required for the catalyst to reach maximum activity. It will be appreciated that the higher the weight percent of active metal, the faster the reaction. A preferred content range of the active metal in the catalyst is from about 0.1 wt % to about 90 percent by weight of the total supported catalyst. A more preferred active metal content range is from about 0.2 wt % to about 75 wt %. A further preferred active metal content range is from about 0.5 wt % to about 60 wt %.

In one embodiment of this invention, a hydrocarbon is produced having a higher ratio of odd-numbered to even-numbered hydrocarbons. In this process, the active metal preferably comprises nickel, more preferably, does not comprise molybdenum. The nickel content of the catalyst for this process is at least 40 wt % (combined nickel and nickel oxide). Preferably, the nickel content is 40 wt % to 90 wt %, more preferably, 45 wt % to 60 wt %.

In one embodiment of this invention, a hydrocarbon is produced having a higher ratio of even-numbered to odd-numbered hydrocarbons. In this process, the active metal preferably comprises nickel, cobalt and molybdenum. The nickel content of the catalyst for this process is generally between 0.2 wt % and 20 wt %, more preferably, between 0.5 wt % and 15 wt %.

The zeolite can be present in any amount. Preferably the zeolite is present in an amount of at least 10 wt %, based on the total catalyst weight, to achieve some hydrocracking and hydroisomerization. Preferably, the zeolite is present in an amount of at least 25 wt %, more preferably 25-50 wt %.

Hydrotreating Process

The hydrotreating process may comprise, but is not limited to, three major reactions: hydrodeoxygenation (HDO), hydroisomerization (HI) and/or hydrocracking (HC). It is known in the art that minor reactions can occur during these steps without significantly altering the desired product.

The HDO process is the removal of oxygen from the fatty acids in triglycerides and other free fatty acids to produce a paraffin (hydrocarbon) product. The HDO can occur either as a decarbonylation, decarboxylation or hydrodeoxygenation or a combination thereof. Decarboxylation refers to the process of removal of oxygen as carbon dioxide producing a paraffinic hydrocarbon. Decarbonylation refers to the process of removal of the oxygen as carbon monoxide and water directly creating an unsaturated hydrocarbon or indirectly by adding hydrogen to produce a saturated hydrocarbon. Hydrodeoxygenation refers to the process of removal of oxygen as water by adding hydrogen. In decarboxylation and decarbonylation, the resulting paraffinic hydrocarbon is one carbon unit shorter than the corresponding carboxylic acid. In hydrodeoxygenation, the resulting hydrocarbon has the same number of carbons as the corresponding carboxylic acid.

Advantageously, the present invention may be tailored to control the route of oxygen removal. For processes that desire minimal use of hydrogen, the decarboxylation and direct decarbonylation routes can be used. For a process that desires minimal evolution of carbon monoxide and carbon dioxide, the indirect decarbonylation or hydrodeoxygenation are the preferred routes.

Controlling the route of oxygen removal also impacts the chain length of the paraffins in the treated feed. The chain length may play an important role in determining which particular deoxygenation process to use. For renewable resources having 18-carbon chains, there may be a preference for n-heptadecane (product of decarbonylation or decarboxylation) or n-octadecane (product of hydrodeoxygenation with hydrogen consumption). n-Heptadecane ($C_{17}$) has a lower melting point than n-octadecane ($C_{18}$), which in turn affects the cold-performance characteristics of the diesel blending stock. Additionally, producing $C_{17}$ removes oxygen from the fatty acid primarily as CO and/or $CO_2$ (reduced hydrogen consumption) whereas making $C_{18}$ hydrocarbons removes oxygen primarily in the form of $H_2O$ (reduced greenhouse gas emissions). Depending on the conditions, one may prefer $C_{17}$ or $C_{18}$ hydrocarbons. These routes can be selectively controlled by varying the type and/or composition of the catalyst as described herein.

Straight chain hydrocarbons, specifically in $C_{17}$ to $C_{18}$ chain lengths, provide good cetane numbers but possess poor cold weather capabilities. Hydroisomerization and hydrocracking improve the cold weather properties. In hydroisomerization, a straight chain hydrocarbon is converted into a branched hydrocarbon. Preferably, isomerization is controlled so that the branched hydrocarbon or the mixture of linear and branched hydrocarbons boils in the range of petro diesel. Hydrocracking reduces the chain length. Shorter hydrocarbons provide a lower melting component in green diesel or as an additive to petro diesel. HI and HC both substantially improve the cold weather properties of green diesel by lowering the cloud and pour points.

Combining process steps, as in one alternative described herein, is advantageous for numerous reasons. Successfully combining the steps decreases the need for additional investment. A single reactor is used in the present invention to produce the desired diesel rather than a two step process in separate reactor vessels. Surprisingly, in the present invention, a single catalyst can be used in contrast to a conventional two step process, which uses two different catalyst compositions, one for the HDO and one for HI/HC. Furthermore, the steps of pretreatment of feed material and removal of impurities from the intermediate product, after HDO and prior to HI/HC, can be eliminated.

Hydrotreatment, as described in the present invention, comprises contacting the feed with hydrogen at elevated temperatures and pressures in the presence of the disclosed catalyst compositions, to hydrodeoxygenate, hydroisomerize and/or hydrocrack the feed into the desired fuel. Temperatures range from 250 to 425° C., preferably at 300 to 400° C., most preferably from 325 to 375° C. Pressures range from 500 to 2500 psig (3,450 to 17,250 kPa), preferably 1000 to 2000 psig (6,900 to 13,900 kPa).

In an alternative embodiment there is provided a process for hydrodeoxygenation of a renewable resource which process comprises (a) providing a feed which is a renewable resource; (b) contacting the feed with a catalyst in the presence of hydrogen at a temperature of 250 to 425° C. and a pressure of 500 to 2500 psig (3,450 to 17,250 kPa), wherein the catalyst comprises one or more active metals selected from the group consisting of nickel, cobalt, molybdenum, tungsten and combinations of two or more thereof and a first oxide, wherein the catalyst is in reduced form, to produce a hydrocarbon product having a ratio of odd-numbered hydrocarbons to even-numbered hydrocarbons of at least 2:1, preferably at least 3:1, more preferably at least 5:1 and most preferably at least 10:1. When the renewable resource comprises over 50% $C_{18}$-based components, such as triglycerides, the process generally favors decarbonylation and/or decarboxylation rather than hydrodeoxygenation.

In a second alternative embodiment there is provided a process for hydrodeoxygenation of a renewable resource which process comprises (a) providing a feed which is a renewable resource; (b) contacting the feed with a catalyst in the presence of hydrogen at a temperature of 250 to 425° C. and a pressure of 500 to 2500 psig (3,450 to 17,250 kPa), wherein the catalyst comprises molybdenum and one or more active metals selected from the group consisting of nickel, cobalt, or mixtures thereof and the catalyst is sulfided prior to use, to produce a hydrocarbon product having a ratio of even-numbered hydrocarbons to odd-numbered hydrocarbons of at least 2:1, preferably at least 3:1, more preferably at least 5:1 and most preferably at least 10:1. Preferably, the catalyst comprises nickel, cobalt and molybdenum. When the renewable resource comprises over 50% $C_{18}$-based components, such as triglycerides, the process generally favors hydrodeoxygenation rather than decarbonylation and/or decarboxylation.

Surprisingly, use of non-precious metals such as nickel, cobalt, molybdenum, or combinations thereof in the hydrotreating process of this invention produces yields of hydrotreated product equivalent or better yields produced using the more expensive, precious metal catalysts such as disclosed in U.S. Patent Publication 2006/0207166. Yields of 90% or better by volume can be achieved with the desired ratio of $C_{17}$ to $C_{18}$ of between 0.05 to 0.95 (based on the desire to reject oxygen either as $CO_2$ or $H_2O$) and the desired ratio of branched (isomerized) to the normal (straight) hydrocarbon can be varied from 0.05 to 0.95% based on the desire for low pour point (more branched) or the desire for increased cetane number (more straight chain).

The present invention may be performed in any suitable type of reactor. Suitable reactors include a fixed bed reactor and a slurry reactor. A fixed bed reactor has an advantage of easy separation of the reactants and products from the catalyst. Fixed bed reactors include plug flow and trickle bed reactors. Fixed bed reactors can be of the type adiabatic, multi-tubular, continuous recirculating packed bed reactor. Slurry reactors include batch, a continuously stirred tank reactor, and a bubble column reactor. In the slurry reactors, the catalyst may be removed from the reaction mixture by filtration or centrifugal action. Preferably, the process of this invention is a continuous process and the reactor is a fixed bed or continuously stirred tank reactor. More preferably, the process is a continuous process and the reactor is a fixed bed reactor.

Preferably, the process is a continuous process in a fixed bed or slurry reactor and the catalyst is in the form of particles, preferably shaped particles. By "shaped particle" it is meant the catalyst is in the form of an extrudate. Extrudates include cylinders, pellets, or spheres. Cylinder shapes may have hollow interiors with one or more reinforcing ribs. Trilobe, cloverleaf, rectangular- and triangular-shaped tubes, cross, and "C"-shaped catalysts can be used.

Preferably the shaped catalyst particle is about 0.01 to about 0.5 inch (about 0.25 to about 13 mm) in diameter when a packed bed reactor is used. More preferably, the catalyst particle is about 1/32 to about 1/4 inch (about 0.79 to about 6.4 mm) in diameter.

A wide range of suitable catalyst concentrations may be used. The amount of catalyst per reactor is generally dependent on the reactor type. For a fixed bed reactor, the volume of catalyst per reactor will be high, while in a slurry, the volume will be lower. Typically, in a slurry reactor, the catalyst will make up 0.1 to about 30 wt % of the reactor contents. Preferably, the catalyst is 1 to 15 wt % of the reactor contents.

For a fixed bed reactor, the weight hourly space velocity will typically fall in the range of 0.05 to 100 $hr^{-1}$, preferably, 0.1 to 10 $hr^{-1}$, more preferably 1.0 to 5.0 $hr^{-1}$.

In one embodiment of the process of the present invention, the feed is contacted with hydrogen to form a liquid feed/hydrogen mixture in advance of contacting the liquid feed/hydrogen mixture with the catalyst. Optionally, a solvent or diluent, having a relatively high solubility for hydrogen so that substantially all the hydrogen is in solution, can be added to the feed and hydrogen in advance of contacting with the catalyst to form a liquid feed/solvent or liquid feed/diluent mixture. The liquid feed/solvent or liquid feed/diluent mixture is then contacted with hydrogen to form a liquid feed/ solvent/hydrogen or liquid feed/diluent/hydrogen mixture. The mixture containing hydrogen is then contacted with the catalyst.

In a preferred process, the liquid feed/solvent/hydrogen or liquid feed/diluent/hydrogen mixture is contacted with catalyst in a packed bed reactor, such as plug flow, tubular or other fixed bed reactor for feed and hydrogen to react. It should be understood that the packed bed reactor may be a single packed bed or multiple beds in series or in parallel or in a combination thereof as discussed hereinabove.

The liquid feed/solvent/hydrogen or liquid feed/diluent/hydrogen mixture can be a substantially hydrogen-gas-free liquid feed stream. The feed stream can be produced by contacting liquid feed with hydrogen and solvent or diluent to produce a hydrogen-saturated liquid feed. Alternatively or in addition, after contacting liquid feed with hydrogen and solvent or diluent, hydrogen gas can be removed from the feed stream, for example, by known gas/liquid separation methods in a disengagement step. Processes for producing hydrogen-gas-free liquid feed streams are known, such as those disclosed in U.S. Pat. Nos. 6,123,835; 6,428,686; 6,881,326 and 7,291,257.

The percentage of hydrogen soluble in the solvent/diluent is greater than the percentage of hydrogen soluble in the liquid feed reactant. In this embodiment, preferably all of the hydrogen required for reaction is made available in solution upstream of the fixed bed reactor, thus eliminating the need to circulate hydrogen gas within the reactor.

The reaction of liquid feed/solvent/hydrogen or liquid feed/diluent/hydrogen mixture with catalyst is highly exothermic and as a result a great deal of heat is generated in the reactor. The temperature of the reactor can be controlled by using a recycle stream. A portion of the paraffin (hydrocarbon) product, (reactor effluent) can be recycled back to the front of the reactor as a recycle stream and blended with fresh feed and hydrogen for use as solvent or diluent.

The process can be a multi-stage process using a series of two or more reactors in series and fresh hydrogen can be added at the inlet of each reactor. The recycle stream absorbs some of the heat and reduces the temperature rise through the reactor. The reactor temperature can be controlled by controlling the fresh feed temperature and the amount of recycle. In addition, because the recycle stream comprises reacted components, the recycle stream also serves as an inert diluent.

The type and amount of diluent added, as well as the reactor conditions can be set so that substantially all of the hydrogen required in the hydrotreating reactions is available in solution. The solvent or diluent is preferably a portion of the reactor effluent used as a recycle stream, but can alternatively be selected from the group consisting of light hydrocarbons, light distillates, naphtha, diesel, or the like. Examples include propane, butanes, and/or pentanes. The percentage of hydrogen in the solvent or diluent is greater than the percentage of hydrogen in the feed, thus, in this embodiment, all of the hydrogen required for reaction is made available in solution upstream of the reactor and eliminating the need to re-circulate hydrogen gas co-eluting with the effluent or product stream.

Green Diesel

The process of this invention may be used to produce green diesel. Green diesel produced in the process of this invention has the desired properties for use as diesel or for blending with petro diesel. The substantially linear product has a high cetane number, which is needed to maintain power for diesel engines to run efficiently. One can use the product as fuel alone, or to blend in lower cetane products, such as light cycle oil, oil sands or kerosene. (Light cycle oils can not be used as a diesel fuel without the used of cetane enhancing additives.)

The green diesel produced in this invention raises the cetane number without negatively impacting the density. Cetane numbers can be controlled by the selection of the specific catalyst and the process conditions. Cetane numbers are desired to be in the range of 50 to 100, more preferably 70 to 100. The branching of some of the chains and the cracking into smaller chains lowers the cloud point temperatures that would allow its usage in cold weather applications down to −40° C., when blended in cold climate petro diesel. The degree of branching is dependent on the temperature of the application and can be controlled by the selection of the properties of the zeolites used in the process and the type and the combination of the metals. Green diesel produced by this process also exhibit the desired lubricity (400 to 650 microns), viscosity (3 to 5 cSt at 40° C.), and density (750 to 800 kg/m$^3$ at 25° C.) suitable for today's diesel engines.

The present invention provides a process for more economical production and implementation of green diesel with little or no impact on current refining production facilities or current diesel engines.

EXAMPLES

Analytical Methods

Samples were dissolved in chloroform and analyzed by GC/MS for peak identification and by GC/FID quantify the individual components unless otherwise stated. For these examples, it is presumed the FID peak area % is equally comparable to weight percent due to the similarity of components (all hydrocarbons, linear and branched). Peaks less than 0.1% were neither identified nor quantified hence the totals are 90% to 95% range. In Table 1, ethanol and a few other minor impurities are contaminants in the chloroform solvent. Most of the yield loss in all the examples, but especially in Examples 5 through 8, is due to evaporation of low boilers upon depressuring the reaction tubes and due to some residual product remaining in the tubes after the reaction was completed and the vessel was emptied.

Catalyst Sulfiding Procedure

A reactor consisting of ¾" (19 mm) OD 316L Stainless Steel tubing 14" (36 cm) long was used for sulfiding catalyst. The reactor was packed with alternating layers of 1 mm glass beads and PYREX wool at both ends, except in the middle, where catalyst (10 to 30 g) was packed. The reactor had 3 thermocouples measuring the gas inlet, gas outlet, and catalyst bed temperatures. The reactor was placed in the vertical tube furnace and the gas inlet and the gas outlet connections were established. The catalyst was allowed to dry overnight at 130° C. with a 200 sccm of nitrogen flow. After drying the catalyst, the oven temperature was increased at a rate of 0.5-1.0° C./minute and 20 sccm hydrogen sulfide (5% mixture in hydrogen) was added to the 200 sccm N$_2$ flow. Once the temperature reached 190° C., the nitrogen flow was reduced to 100 sccm and the hydrogen sulfide flow was increased to 30 sccm. The temperature was held at 240° C. After 2 hours, the temperature was reduced slowly. Once the temperature was below 125° C., the hydrogen sulfide flow was stopped but the nitrogen flow was maintained at 100 sccm until reactor reached room temperature (approx 25° C.). The reactor was removed from the furnace and was unloaded in a nitrogen purge box.

Catalyst Reduction Procedure

Similar equipment and set-up used for sulfiding catalyst was used for reducing the catalyst. The catalyst was dried overnight at 130° C. under a 200 sccm nitrogen flow. The reactor had 3 thermocouples measuring the gas inlet, gas outlet, and catalyst bed temperatures. The reactor was placed in the vertical tube furnace and the gas inlet and the gas outlet connections were established. The catalyst was allowed to dry overnight at 130° C. with a 200 sccm of nitrogen flow. After drying the catalyst, the oven temperature was increased at a rate of 0.5-1.0° C./minute and 20 sccm hydrogen gas (99.0% purity) was added to the 200 sccm $N_2$ flow. Once the temperature reached 190° C., the nitrogen flow was reduced to 100 sccm and the hydrogen flow was increased to 30 sccm. The temperature was held at 240° C. unless noted otherwise. For Comparative Examples B and D the temperature was increased to 250° C. and for Comparative Example C, the temperature was increased to 350° C. After 2 hours, the temperature was reduced slowly. Once the temperature was below 125° C., the hydrogen flow was stopped but the nitrogen flow was maintained at 100 sccm until reactor reached room temperature (approx 25° C.). The reactor was removed from the furnace and was unloaded in a nitrogen purge box.

Example 1

Soybean oil (100 g, available from Sigma-Aldrich Co., St. Louis, Mo.) and a reduced Ni/NiO/MgO/SiO$_2$/graphite catalyst (Pricat Ni 55/5 P, 5 g, available from Johnson Matthey, West Deptford, N.J.) were placed in a 400 cc agitated pressure reactor. Soybean oil comprises triglycerides with the following distribution chain lengths: $C_{12}$=5%, $C_{14}$=5%, $C_{16}$=10%, $C_{18}$=3%, $C_{18:1}$=20%, $C_{18:2}$=50%, $C_{18:3}$=7%. $C_{18:1}$ refers to an 18 carbon chain with 1 unsaturated bonds, $C_{18:2}$ refers to an 18 carbon chain with 2 unsaturated bonds, and $C_{18:3}$ refers to an 18 carbon chain with 3 unsaturated bonds. The autoclave headspace was purged first with nitrogen 10 times by pressurizing/depressurizing between 90 and 0 psig (722 and 101 kPa), then with industrial grade hydrogen (high pressure 99% purity, available from GTS Inc., Morrisville, Pa., USA) 5 times, and finally pressurized to 500 psig (3550 kPa) with hydrogen. The autoclave and its contents were heated to 250° C. with agitation. The hydrogen pressure was increased to 2000 psig (13,900 kPa), and maintained there for 5 hours. The headspace was filled with fresh hydrogen to 2000 psig (13,900 kPa) if the pressure dropped below 1500 psig (10,400 kPa). The temperature was maintained at 250±10° C.

The autoclave contents were then cooled to below 50° C., the headspace was vented, and the contents (103 g) were discharged to a glass bottle. IR and $^1$H NMR analysis showed the presence of residual mono-, di- and triglycerides. A small sample was then transesterified using methanol and base catalyst and the resulting sample was analyzed using GC-MS (peak identification) and GC-FID (species quantification) to show that the sample was equally divided among the methyl esters of the fatty acids (unreacted glycerides), alpha-olefins and normal paraffins (hydrocarbons). Thus, the nickel catalyst hydrodeoxygenated the soybean oil.

Example 2

Soybean oil (50 g) and the catalyst used in Example 1 were placed in a 400 cc agitated pressure reactor. The reaction was run at 300° C. and the catalyst contained USY zeolite powder (0.125 g, type EZ-190, available from Engelhard (now part of BASF), Si/Al=3.05) physically mixed in. The reaction contents were weighed (51 g). The sample was base transesterified. IR showed the sample to be pure hydrocarbon with a trace of ester. A proton NMR analysis showed that the ester impurity was minute (<100 ppm). A GC-FID analysis gave the following linear paraffin (hydrocarbon) product distribution by weight: $C_{18+}$=1%, $C_{18}$=2%, $C_{17}$=78%, $C_{16}$=3%, $C_{15}$=11%, $C_{14}$=1%, $C_{14}$=4%. Some branching (<0.5 wt % isoheptadecane, "iso-$C_{17}$" was observed.

Example 3

The process of Example 2 was repeated using the same equipment, pressure and temperature conditions, and the reactants except for the catalyst and no zeolite was added. The catalyst used was reduced nickel powder catalyst on zirconia and kieselguhr (E-473P, 2.5 g, available from BASF Catalysts, Houston, Tex., USA). The reaction products were weighed (51 g). An IR spectrum showed no ester in the sample. A GC-FID analysis gave the following linear paraffin (hydrocarbon) distribution by weight: $C_{18+}$=1%, $C_{18}$=2%, $C_{17}$=84%, $C_{16}$=1%, $C_{15}$=11%, $C_{14-}$=1%. Branching was not observed.

Example 4

Example 2 was repeated using the same equipment, pressure and temperature conditions. The reactants were the same as in Example 2, but different amounts were used (100 g soybean oil, 5 g Ni 55/5 P catalyst, and 0.5 g of USY zeolite powder, type EZ-190). A GC-FID analysis gave the following product distribution by weight: n-$C_{18}$ acid (octadecanoic acid)=56%, n-$C_{18}$=9%, n-$C_{17}$=29%, iso-$C_{17}$=1%, n-C16=1%, n-C15=4%. The Example shows that the addition of zeolite catalyst results in isomerized product, with low, 10% zeolite present.

Examples 5 Through 8

Examples 5 through 8 illustrate hydrocracking and hydroisomerization in a single step. Results from Examples 5 through 8 are summarized in Table 1 below. The Examples used a feed comprised of a mixture of hydrocarbons: 3% n-$C_{19}$, 91% n-$C_{18}$, and 6% n-$C_{17}$) prepared by hydrodeoxygenating canola oil in a continuous flow reactor using a commercial nickel/molybdenum on alumina catalyst at a temperature 325° C. and pressure 1500-2000 psig (10,400-13,900 kPa), followed by distilling the product to obtain a predominantly n-$C_{18}$ cut.

This feed mixture (100 g) was reacted with reduced Ni/NiO/MgO/SiO$_2$/graphite catalyst (Pricat Ni 55/5 P catalyst) (2.5 g) individually mixed with 4 different zeolite powders (2.5 g), specified in Table 1. These Examples were conducted at 300° C. and 1500 to 2000 psig (13,900 kPa) under hydrogen in 400-cc pressure tubes for 5 hours under constant shaking. H$_2$ uptake was less than those in Examples 1 through 4.

TABLE 1

Zeolites and weight percent of products for Examples 5 through 8

| | Example No. | | | |
|---|---|---|---|---|
| | 5 | 6 | 7 | 8 |
| | | Zeolite | | |
| | Mordenite | Beta | LZ-Y-84 | USY |
| | | Product Amount, g | | |
| Product I.D. by GC/MS | 87 | 82 | 42 | 48 |
| Isobutane | 4.4 | 6.1 | 9.8 | 8.9 |
| Isopentane | 12.6 | 14.1 | 35.2 | 31.8 |
| Isohexane | 12.9 | 14.5 | 37.1 | 34.8 |

TABLE 1-continued

Zeolites and weight percent of products for Examples 5 through 8

| | Example No. | | | |
|---|---|---|---|---|
| | 5 | 6 | 7 | 8 |
| | Zeolite | | | |
| | Mordenite | Beta | LZ-Y-84 | USY |
| | Product Amount, g | | | |
| Product I.D. by GC/MS | 87 | 82 | 42 | 48 |
| n-Heptane | 5.6 | 5.7 | 6.4 | 8.0 |
| 2-Methylheptane | 4.9 | 3.4 | — | 1.3 |
| 3-Methylheptane | 3.5 | 2.9 | — | 1.1 |
| 3-Methyloctane | 4.6 | 3.3 | — | 4.0 |
| Ethanol | 11.4 | 7.3 | 3.5 | — |
| 2-Methylnonane | 3.7 | 2.4 | — | — |
| p-Xylene | — | — | 0.1 | 0.1 |
| Undecane | — | — | — | — |
| o-Xylene | — | — | — | 0.1 |
| Dodecane | — | — | — | — |
| 1,2,4-Trimethylbenzene | — | — | — | 0.1 |
| C3-Benzene | — | — | — | 0.2 |
| Tridecane | — | — | 0.2 | — |
| Tetradecane | — | — | — | — |
| Tetradecane C14 | — | — | — | — |
| Pentadecane C15 | — | — | — | — |
| Hexadecane C16 | 8.2 | 3.8 | — | — |
| Heptadecane $C_{17}$ | 3.5 | 3.7 | — | — |
| 4-Ethyltetradecane | 2.1 | 1.0 | — | — |
| 4-Methylhexadecane | 0.7 | 0.3 | — | — |
| 2-Methylheptadecane | 0.4 | 0.2 | — | — |
| 4-Methylheptadecane | 1.6 | 0.9 | — | — |
| Octadecane $C_{18}$ | 14.2 | 25.7 | — | — |
| Nonadecane $C_{19}$ | 0.3 | 0.6 | — | — |
| Percent Totals | 94.6 | 95.9 | 92.3 | 90.4 |

As can be seen from table 1, linear hydrocarbons similar to those produced in Examples 1 through 3, undergo hydroisomerization and hydrocracking using catalysts comprising nickel supported on alumina combined with a zeolite.

Example 9 n-Octadecane feed (100 g, same as used in Examples 5 through 8) and reduced Ni/NiO/MgO/SiO$_2$/graphite catalyst (Pricat Ni 55/5 P catalyst, 2.5 g) were placed in a 400 cc agitated pressure reactor. The autoclave headspace was purged first with nitrogen 10 times by pressurizing/depressurizing between 90 and 0 psig (722 and 101 kPa), then with industrial grade hydrogen (high pressure, 99% purity, available from GTS Inc., Morrisville, Pa.) 5 times, and finally pressurized to 500 psig (3550 kPa) with hydrogen. The autoclave and its contents were heated to 325° C. with agitation. The hydrogen pressure was increased to 2000 psig (13,900 kPa), and maintained there for 5 hrs. The headspace was filled with fresh hydrogen to 2000 psig (13,900 kPa) if the pressure dropped below 1500 psig (10,400 kPa). The temperature was maintained at 325±10° C.

The autoclave contents were then cooled to below 50° C., the headspace was vented, and the contents (~100 g, including the catalyst) were discharged to a glass bottle. A GC-FID analysis gave the following linear paraffin (hydrocarbon) product distribution by weight: $C_{19}$=3%, $C_{18}$=84%, $C_{17}$=13%. Note that the catalyst seemed to have converted some n-$C_{18}$ to n-$C_{17}$ through hydrocracking, but did not cause any isomerization.

Example 10

Soybean oil from Sigma-Aldrich, 50 g, and alumina-supported pre-sulfided cobalt/nickel/molybdenum tri-metallic hydrotreating catalyst (5 g, CRI DC2318, commercially available Criterion Catalysts and Technologies, Houston, Tex.) were placed in a 210 cc agitated pressure reactor. The vessel was leaked check with nitrogen. The headspace of the reactor was purged with nitrogen 10 times by pressurizing to 90 psig (722 kPa) and depressurizing to 0 psig (101 kPa). The reactor was then purged with high purity hydrogen (99.9% min., commercially available from Air Products, Allentown, Pa.) five times, and pressurized to 1000 psig (7000 kPa) with hydrogen. The reactor and its contents were agitated and heated to 325° C. (617° F.). The hydrogen pressure was increased to 2000 psig (13,900 kPa), and maintained there for 5 hours. The headspace was filled with fresh hydrogen to 1500-1700 psig (11,800 kPa) if the pressure dropped below 1000 psig (7000 kPa).

The reactor contents were then cooled to below 50° C. (122° F.), the headspace was vented, and the contents were discharged to a glass bottle. The contents were weighed (51 g). IR and $^1$H NMR analysis showed no evidence of mono-, di- and triglycerides. The sample was then analyzed using GC-MS (peak identification) and GC-FID (species quantification) to show that the sample was converted to the following linear paraffins (hydrocarbons) by weight: $C_{18'}$=1%, $C_{18}$=81%, $C_{17}$=6%, $C_{16}$=11.5%, $C_{15}$=0.5%. The $C_{18}$:$C_{17}$ ratio is greater than 13:1 and $C_{16}$:$C_{15}$ ratio is greater than 20:1.

Example 11

Example 10 was repeated using the same equipment, reaction conditions, procedures and the reactant (50 g), except for different hydrotreating catalyst (5 g, alumina-supported pre-sulfided nickel/molybdenum bi-metallic hydrotreating catalyst, CRI DN-3330, commercially available Criterion Catalysts and Technologies, Houston, Tex.). A GC-FID analysis of the product gave the following linear paraffin (hydrocarbon) product distribution by weight: $C_{18'}$=1%, $C_{18}$=73%, $C_{17}$=12%, $C_{16}$=10%, $C_{15}$=1.5%. There was also 2.5% of n-octadecanoic acid in the product. The $C_{18}$:$C_{17}$ ratio is over 6 and $C_{16}$:$C_{15}$ ratio is over 7.

Example 12

Catalyst (5 g, CRI DC2318), temperature and pressure conditions were repeated from Example 10 except crude soybean oil (50 g, obtained from Perdue Farms, Salisbury, Md.) was used. The reaction products were analyzed by GC-FID to obtain the following linear paraffin (hydrocarbon) distribution by weight: $C_{18+}$=0.5%, $C_{18}$=80%, $C_{17}$=7%, $C_{16}$=11.6%, $C_{15}$=0.9%. The $C_{18}$:$C_{17}$ ratio is greater than 11:1 and $C_{16}$:$C_{15}$ ratio is greater than 12:1.

Example 13

Catalyst (5 g, CRI DC2318), temperature and pressure conditions were repeated from Example 10 using the same equipment, pressure, and temperature, except for a refined, bleached, and deodorized soybean oil sample (50 g, obtained from Perdue Farms, Salisbury, Md.) was used. The reaction products were analyzed by GC-FID to obtain the following linear paraffin (hydrocarbon) distribution by weight: $C_{18+}$=0.5%, $C_{18}$=79%, $C_{17}$=8%, $C_{16}$=11.3%, $C_{15}$=1.2%. The $C_{18}$:$C_{17}$ ratio is almost 10, and $C_{16}$:$C_{15}$ ratio is greater than 9.

Example 14

The process of Example 13 was repeated using the same equipment, temperature, pressure, and catalyst (5 g), except refined coconut oil, (50 g, obtained from Spectrum Chemicals of Gardena, Calif.) was used. The reaction products were analyzed by GC-FID to obtain the following linear paraffin (hydrocarbon) distribution by weight: $C_{18}$=9%, $C_{17}$=1%, $C_{16}$=9%, $C_{15}$=1%, $C_{14}$=17.5, $C_{13}$=2, $C_{12}$=43.5%, $C_{11}$=4, $C_{10}$=5.5, $C_9$=0.5, $C_8$=6.5%, $C_7$=0.5%. The $C_{18}$:$C_{17}$ ratio is approximately 9, $C_{16}$:$C_{15}$ ratio is 9, $C_{14}$:$C_{13}$ ratio is approximately 9, $C_{12}$:$C_{11}$ ratio is approximately 11, $C_{10}$:$C_9$ ratio is 11, and $C_8$:$C_7$ ratio is 13.

Example 15

The process of Example 13 was repeated using the same equipment, pressure, temperature, and catalyst (5 g), except palm oil (50 g, manufactured by T. I. International Ghana Ltd. of Accra, Ghana) was used. The reaction products were analyzed by GC-FID to obtain the following linear paraffin (hydrocarbon) distribution by weight: $C_{18+}$=0.5%, $C_{18}$=46.5%, $C_{17}$=5%, $C_{16}$=43%, $C_{15}$=4%, $C_{14}$=1%. The $C_{18}$:$C_{17}$ ratio is greater 9, and $C_{16}$:$C_{15}$ ratio is greater than 10.

Example 16

The process of Example 13 was repeated using the same equipment, pressure, temperature, and catalyst (5 g), except chicken fat (50 g, obtained from Perdue Farms of Salisbury, Md.) was used. The reaction products were analyzed by GC-FID to obtain the following linear paraffin (hydrocarbon) distribution by weight: $C_{18+}$=1%, $C_{18}$=60%, $C_{17}$=7%, $C_{16}$=28%, $C_{15}$=3%, $C_{14}$=1%. The $C_{18}$:$C_{17}$ ratio is approximately 9, and $C_{16}$:$C_{15}$ ratio is greater than 9.

Example 17

D100824-67 Stearic Acid, CRI Catalyst DC-2318

The process of Example 13 was repeated using the same equipment, pressure, temperature, and catalyst (5 g), except stearic acid (50 g, from VWR, West Chester, Pa.) was used. The reaction products were analyzed by GC-FID to obtain the following linear paraffin (hydrocarbon) distribution by weight: $C_{18+}$=0.7%, $C_{18}$=90.4%, $C_{17}$=8.4%, $C_{16}$=0.5%. The $C_{18}$:$C_{17}$ ratio is approximately 10.8.

Example 18

The process of Example 13 was repeated using the same equipment, pressure, temperature, and catalyst (5 g), except a 50:50 chicken fat to soybean oil mixture (50 g, mixed in-house with chicken fat and soybean oil obtained from Perdue Farms of Salisbury, Md.) was used. The reaction products were analyzed by GC-FID to obtain the following linear paraffin (hydrocarbon) distribution by weight: $C_{18+}$=2.1%, $C_{18}$=69.6%, $C_{17}$=7.2%, $C_{16}$=18.5%, $C_{15}$=1.9%, $C_{14}$=0.5%, $C_{13}$=0.1%, $C_{12}$=0.1%. The $C_{18}$:$C_{17}$ ratio is approximately 9.7, and $C_{16}$:$C_{15}$ ratio is greater than 2.5.

Comparative Example A

The process of Example 18 was repeated using the same equipment, pressure, except the temperature was 400° C., the catalyst was alumina-supported non-sulfided nickel/molybdenum bi-metallic hydrotreating catalyst, (5 g, AT 535, from Grace-Davidson, Columbia, Md.), and crude soybean oil (50 g, obtained from Perdue Farms, Salisbury, Md.) was used. The catalyst was reduced, as described hereinabove. No reaction occurred.

Comparative Example B

The process of Example 18 was repeated using the same equipment, pressure, except the temperature was 500° C., Grace-Davidson AT 535 catalyst (5 g), and crude soybean oil from Perdue Farms (50 g) was used. The catalyst was reduced, as described herein above. No reaction occurred.

Example 19

The process of Example 18 was repeated using the same equipment, pressure, and temperature except the catalyst was Grace-Davidson AT 535 catalyst (5 g) and crude soybean oil from Perdue Farms (50 g) was used. The catalyst was sulfided, as described hereinabove. The reaction products were analyzed by GC-FID to obtain the following linear paraffin distribution by weight: $C_{18+}$=2.0%, $C_{18}$=78.0%, $C_{17}$=8%, $C_{16}$=10%, $C_{15}$=1.1% $C_{14}$=0.2%, $C_{13}$=0.2%, $C_{12}$=0.1%, $C_{11}$=0.1%, $C_{7-10}$=0.3%. The $C_{18}$:$C_{17}$ ratio is approximately 9.75, and $C_{16}$:$C_{15}$ ratio is greater than 9.

Comparative Example D

The process of Example 18 was repeated using the same equipment, pressure, and temperature, except the catalyst was alumina-supported non-sulfided nickel/cobalt/molybdenum tri-metallic hydrotreating catalyst, (5 g, AT 592, from Grace-Davidson, Columbia, Md.), and crude soybean oil (50 g, obtained from Perdue Farms, Salisbury, Md.) was used. The catalyst was reduced, as described hereinabove. No reaction occurred.

Example 20

The process of Example 19 was repeated using the same equipment, pressure, and temperature except Grace-Davidson AT 792 catalyst (5 g,) was used. The catalyst was sulfided, as described hereinabove. The reaction products were analyzed by GC-FID to obtain the following linear paraffin distribution by weight: $C_{18+}$=1.8%, $C_{18}$=82.4%, $C_{17}$=3.3%, $C_{16}$=11.2%, $C_{15}$=0.5%, $C_{14}$=0.2%, $C_{13}$=0.1%, $C_{12}$=0.1%, $C_{11}$=0.1%, $C_{7-10}$=0.3%. The $C_{18}$:$C_{17}$ ratio is approximately 25, and $C_{16}$:$C_{15}$ ratio is greater than 22.

As can be seen from Examples 10-20 and Comparative Examples A-D, the cobalt/nickel/molybdenum and nickel/molybdenum catalysts produced higher ratio of even-numbered hydrocarbons to odd-numbered hydrocarbons.

What is claimed is:
1. A process for hydrotreating a liquid feed comprising
(a) providing a liquid feed which is a renewable resource comprising aliphatic hydrocarbon chains having $C_{12}$ to $C_{20}$ moieties; and
(b) contacting the feed with a catalyst in the presence of hydrogen at a temperature of 250 to 425° C. and a pressure of 500 to 2500 psig (3,450 to 17,250 kPa) such that isomerization and hydrocracking occur to produce a paraffin (hydrocarbon) product,
wherein the catalyst comprises one or more active metals selected from the group consisting of nickel, cobalt, and combinations thereof and a first oxide selected from the group consisting of alumina, silica, titania, zirconia, kieselguhr, silica-alumina, and combinations thereof, and a second oxide wherein the second oxide comprises a zeolite and wherein the zeolite is present in an amount of at least 10 wt %, based on the total catalyst weight, and wherein the first oxide is used as a support for the active metal and wherein the second oxide is physically mixed with the active metal and the first oxide.

2. The process of claim 1 wherein the feed is an oil derived from plants and/or animals and comprises one or more triglyceride.

3. The process of claim 2 wherein the triglyceride is derived from a plant selected from the group consisting of pine, rape seed, sunflower, palm, jathropa, seashore mallow and combinations of two or more thereof.

4. The process of claim 1 wherein the feed is a vegetable oil selected from the group consisting of canola oil, palm oil, coconut oil, palm kernel oil, sunflower oil, soybean oil, crude tall oil, and combinations of two or more thereof.

5. The process of claim 1 wherein the concentration of metal in the catalyst is 45 to 60 weight percent.

6. The process of claim 5 wherein the catalyst comprises nickel which is in reduced form.

7. The process of claim 6 wherein the catalyst is reduced by treating the catalyst with hydrogen at a temperature from 100° C. to 400° C.

8. The process of claim 6 wherein the zeolite is present in an amount of at least 25 wt %, based on the total catalyst weight.

9. The process of claim 7 wherein the zeolite is present in an amount of 25-50 wt %, based on the total catalyst weight.

10. The process of dam 6 wherein the renewable resource comprises over 50% $C_{18}$-based components.

11. The process of claim 1 wherein the zeolite is selected from the group consisting of MFI (ZSM-5), MEL (ZSM-11), FAU (zeolite Y or USY), MOR (mordenite), BEA (beta).

12. The process of claim 1 wherein the zeolite is present in an amount of 25-50 wt %.

13. The process of claim 1 wherein the temperature is 300 to 400° C.

14. The process of claim 13 wherein the temperature is 325 to 375° C.

15. The process of claim 1 wherein the pressure is 1000 to 2000 psig (7000 to 13,900 kPa).

16. The process of claim 1 wherein the process is a continuous process and the reactor is a fixed bed reactor or a continuously stirred tank reactor.

17. The process of claim 16 wherein the reactor is a fixed bed reactor.

18. The process of claim 16 wherein the feed is contacted with a solvent or diluent and hydrogen to provide a liquid feed/solvent/hydrogen or liquid feed/diluent/hydrogen mixture in advance of contacting the feed with the catalyst.

19. The process of claim 18 wherein a portion of the product is recycled back to the reactor as a recycle stream and blended with fresh feed and hydrogen for use as solvent or diluent.

20. The process of claim 17 wherein the liquid feed/solvent/hydrogen or liquid feed/diluent/hydrogen mixture is a substantially hydrogen-gas-free liquid feed stream.

* * * * *